US011999595B1

(12) United States Patent
Gifford

(10) Patent No.: US 11,999,595 B1
(45) Date of Patent: Jun. 4, 2024

(54) LOAD LIFTER ASSEMBLY

(71) Applicant: Charles L Gifford, Camanche, IA (US)

(72) Inventor: Charles L Gifford, Camanche, IA (US)

(73) Assignee: JJB Solutions LLC, Camanche, IA (US)

(*) Notice: Subject to any disclaimer, the term of this patent is extended or adjusted under 35 U.S.C. 154(b) by 0 days.

(21) Appl. No.: 17/226,063

(22) Filed: Apr. 8, 2021

Related U.S. Application Data

(60) Provisional application No. 63/006,722, filed on Apr. 8, 2020.

(51) Int. Cl.
*B66C 1/28* (2006.01)
*B63B 27/12* (2006.01)

(52) U.S. Cl.
CPC ................ *B66C 1/28* (2013.01); *B63B 27/12* (2013.01)

(58) Field of Classification Search
CPC .................................. B66C 1/28; B63B 27/12
USPC ............................................ 294/81.56, 67.31
See application file for complete search history.

(56) References Cited

U.S. PATENT DOCUMENTS

| | | | | |
|---|---|---|---|---|
| 718,506 A * | 1/1903 | Normandin | B66C 1/28 | 294/67.32 |
| 2,857,194 A * | 10/1958 | Brown | B66C 1/32 | 294/67.32 |
| 2,946,618 A * | 7/1960 | Klahn | B66C 1/22 | 294/67.32 |
| 3,424,488 A * | 1/1969 | Renfroe | B66C 1/32 | 294/67.32 |
| 3,437,369 A * | 4/1969 | Gealy | B66C 1/32 | 294/90 |
| 3,558,178 A * | 1/1971 | Taylor | B66C 1/64 | 294/67.32 |
| 5,476,300 A | 12/1995 | Dodge | | |
| 8,562,047 B2 * | 10/2013 | Parker | B66C 1/66 | 294/82.16 |
| 9,290,370 B1 * | 3/2016 | Panio | B66F 19/005 | |
| 9,434,580 B2 * | 9/2016 | Bakalyar | B66C 1/12 | |
| 10,435,281 B1 | 10/2019 | Morris | | |
| 10,947,096 B2 | 3/2021 | Morris | | |

* cited by examiner

*Primary Examiner* — Lynn E Schwenning
(74) *Attorney, Agent, or Firm* — Hamilton IP Law, PC.; Jay R. Hamilton

(57) ABSTRACT

A Load Lifter Assembly is configured to allow for lifting, moving and releasing a barge lid via a material hander such as a crane without need for manual intervention between the load lifter assembly and the barge lid.

3 Claims, 29 Drawing Sheets

LOAD LIFTER ASSEMBLY

CROSS REFERENCE TO RELATED APPLICATIONS

The present non-provisional patent application claims benefit of provisional U.S. Pat. Application Ser. No. 63,006,722 filed on Apr. 8, 2020, which is incorporated by reference herein in its entirety.

FIELD OF THE INVENTION

The present disclosure relates to a Load Lifter Assembly which is useful in at least one embodiment for placement and removal of barge lids. One benefit of the of the Load Lifter Assembly as described and claimed herein is to improve safety as the Load Lifter Assembly does not require deckhands to engage with the barge lid during placement and removal.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable.

AUTHORIZATION PURSUANT TO 37 C.F.R. § 1.171 (c)

A portion of the disclosure of this patent document may contain material that is subject to copyright and trademark protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

In the past a set of chains with (4) 19' long legs were used to hook the lids. It would require (2) guys on top of the lids to separate the chains and then walk them down the sides to hook them to the eyes of the lid. If setting lids on the dock, it took (2) more workers to guide the lid and then unhook the chains.

SUMMARY OF INVENTION

The Load Lifter Assembly as disclosed is a device that allows for hooking and unhooking barge covers (lids, typically made of fiberglass) unassisted. The Load Lifter Assembly as disclosed herein does not require any workers to hook or unhook for movement of the lid between the barge and the dock. It consists of a main body having four (4) attached legs and four (4) mechanical arms with hooks and guide wheels attached at the end of those legs. As nearly all river terminals use material handler(s) (a crane, a loader or a high-line) with a clamshell bucket, the Load Lifter Assembly is configured with a "T" shaped piece on top for the bucket to engage (clamshell pinches) to lift the Load Lifter Assembly. Additionally, there is a switch mechanism positioned in the center of the main body assembly that rotates a quarter turn each cycle (similar to a ball point pen). In the initial lift, the whole assembly is lifted. When the Load Lifter Assembly is set down on the lid, the switch mechanism in the center releases and rotates ninety (90) degrees engaging the load anus with the hooks to grab the eyes on the lids. Once the lid is sat back down, the switch mechanism in the center rotates ninety (90) degrees again, releasing the hooks allowing lifting of the device off of the barge lid.

BRIEF DESCRIPTION OF THE DRAWINGS

The accompanying drawings, which are incorporated in and constitute a part of this specification, illustrate embodiments and together with the description, serve to explain and illustrate the principles of the Load Lifter Assembly as disclosed herein.

FIG. 11A is a side view showing the latching eyes unlocked. FIG. 11B is a side view showing the latching eyes locked.

Figure 1:
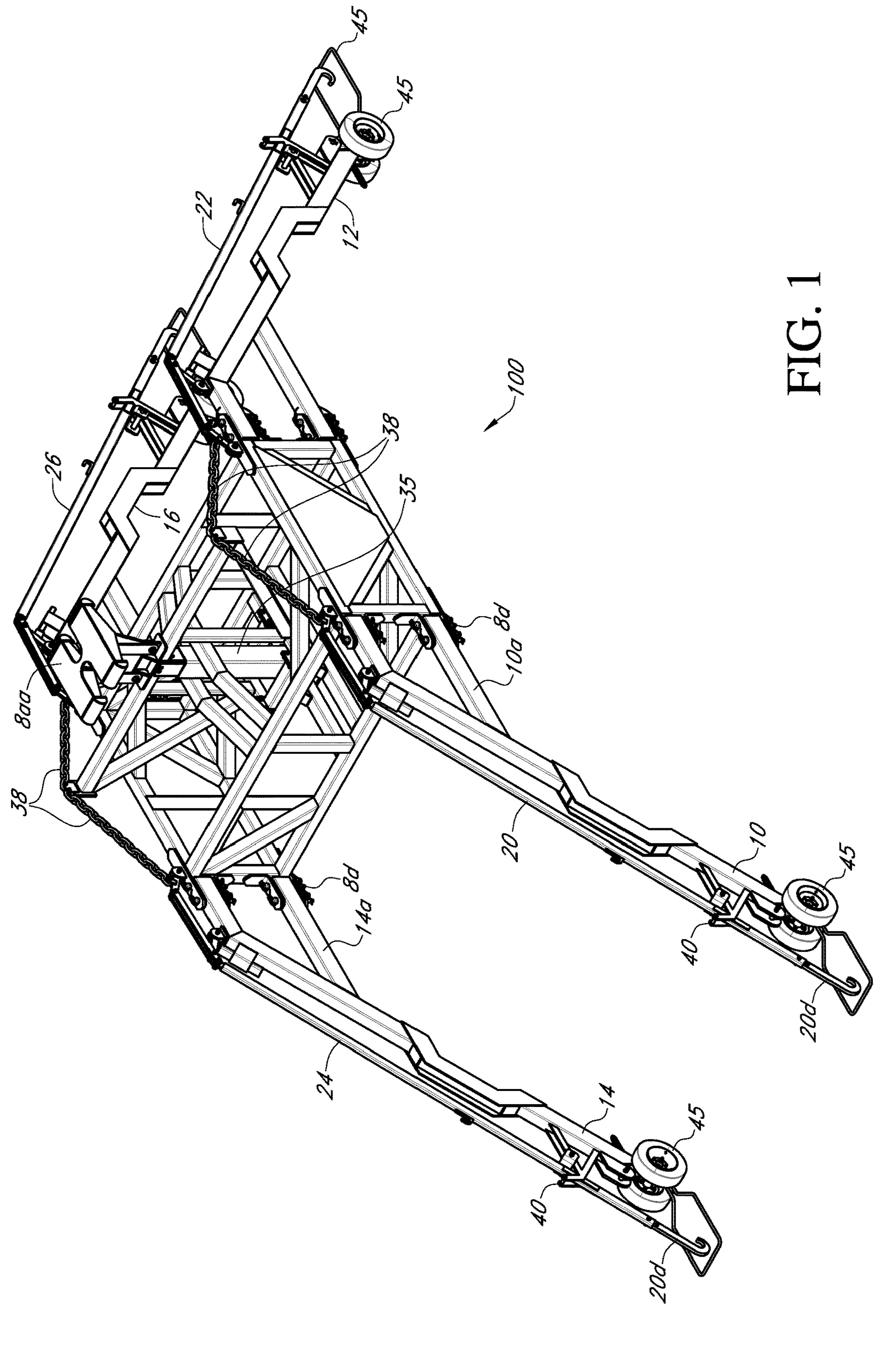
FIG. 1 is a side view of the Load Lifter Assembly for enablement of the present disclosure.

Applicant includes herein an Appendix, which is incorporated by reference herein, with prints which provide further details including dimensions which would enable and support fabrication of at least one embodiment of the Load Lifter Assembly disclosed and claimed herein.

DETAILED DESCRIPTION-TABLE OF ELEMENTS

| Element Description | Element Number |
|---|---|
| Barge lid | 1 |
| Barge lid edge | 1a |
| Barge lid ridge | 1b |
| Barge lid depression | 1c |
| Barge | 1d |
| Hooks/eyes of barge lid | 2 |
| Hook portion of eye | 2a |
| Eyelet portion | 2b |
| Bracket (eye) | 3 |
| Main body | 8 |
| Upper portion | 8a |
| Engagement end (T-shaped) | 8aa |
| Central portion | 8b |
| Lower portion | 8c |
| Plates | 8d |
| Mounting e[E]yes | 9 |
| Loading legs-first | 10 |
| Loading legs-first-first end | 10a |
| Loading legs-first-second end | 10b |
| Loading legs-second | 12 |
| Loading legs-second-first end | 12a |
| Loading legs-second-second end | 12b |
| Loading legs-third | 14 |
| Loading legs-third-first end | 14a |
| Loading legs-third-second end | 14b |
| Loading legs-fourth | 16 |
| Loading legs-fourth-first end | 16a |
| Loading legs-fourth-second end | 16b |
| Spring catch | 18 |
| Load arm assembly ($1^{st}$) | 20 |
| $1^{st}/2^{nd}$ Drop-down member | 20a/20aa |
| Horizontal member | 20b |
| Rod | 20c |
| Hooked end | 20d |
| Load arm assembly ($2^{nd}$) | 22 |
| Load arm assembly (3rd) | 24 |
| Load arm assembly ($4^{th}$) | 26 |
| Master switch assembly (hydraulic control system) | 30 |
| Upper switch plate | 32 |
| Shaft | 33a |
| Upper blade | 33b |

-continued

DETAILED DESCRIPTION-TABLE OF ELEMENTS

| Element Description | Element Number |
|---|---|
| Lower blade | 33c |
| Lower switch plate | 34 |
| Lower wedges | 34a |
| Outer tube | 35 |
| Inner tube | 36 |
| Upper wedges | 37a |
| Slot | 37b |
| Chain | 38 |
| Spring | 39 |
| Guide assembly | 40 |
| Pin | 42 |
| Clevis | 43 |
| Guide wheels | 45 |
| Guard | 46 |
| Lifting Device (crane, loader, excavator) (not shown) | 50 |
| Working End (hook, cable, chain, loader bucket, excavator bucket) | 51 |
| Load Lifter Assembly | 100 |

DETAILED DESCRIPTION

Before the present Load Lifter Assembly 100 is disclosed and described, it is to be understood that the Load Lifter Assembly 100 is not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used with at least one embodiment of the disclosed Load Lifter Assembly 100. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all potential embodiments of the Load Lifter Assembly 100. This applies to all aspects of this application including, but not limited to, components of a Load Lifter Assembly 100. Thus, if there are a variety of additional components that can be added it is understood that each of these additional components can be added with any specific embodiment or combination of embodiments of the Load Lifter Assembly 100. The present Load Lifter Assembly 100 may be understood more readily by reference to the following detailed description of preferred embodiments and the examples included therein and to the Figures and their previous and following description. Generally, FIGS. 1-7 are engineering drawings made to assemble to a prototype which is disclosed herein in sufficient detail as to enable one of ordinary skill in the art as to the invention. FIGS. 7-10 are various views of the Load Lifter Assembly 100 engaged with a barge lid during attachment and removal.

Enabling Embodiment

FIG. 1 is a perspective view of the Load Lifter Assembly 100 disclosed herein along with detailed call outs for enablement of the present disclosure. As shown in FIG. 1, the Load Lifter Assembly 100 has four loading legs 10, 12, 14 and 16, respectfully, for use in lifting operations of barge lids 1. The main (truss) body 8 has an upper portion 8*a* (upper assembly), a center portion 8*b* and a lower portion 8*c*. The upper portion 8*a* has an engagement end 8*aa* which is generally configured for engagement with the working end 51 (bucket, hook or clamshell as shown throughout) of a lifting device 50. As shown in the figures, it has a "T-shape" but is not so limited or restricted, as many other shapes may be suitable for a particular application.

Figure 1A:
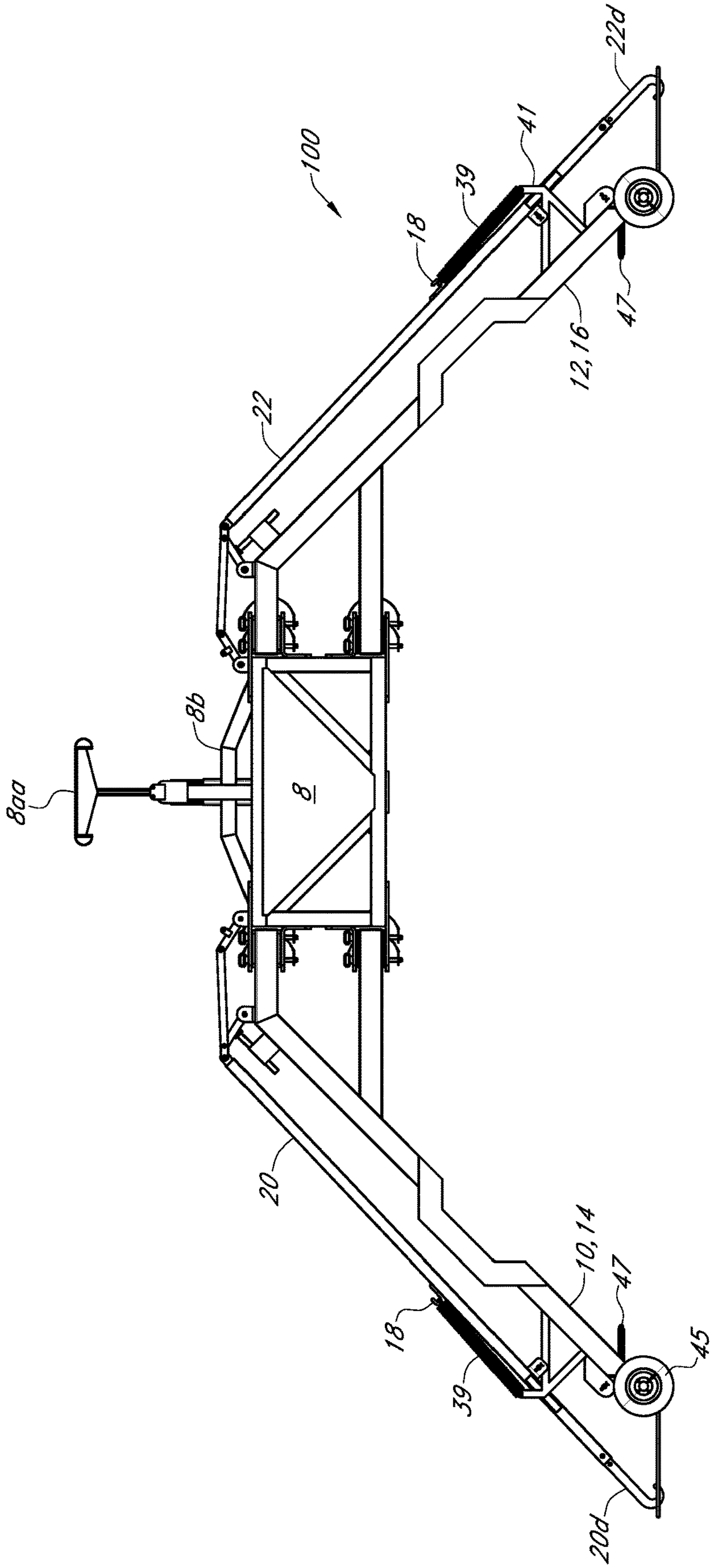
FIG. 1A is a side view of the Load Lifter Assembly disclosed herein along with detailed call outs for enablement of the present disclosure.
Figure 1B:
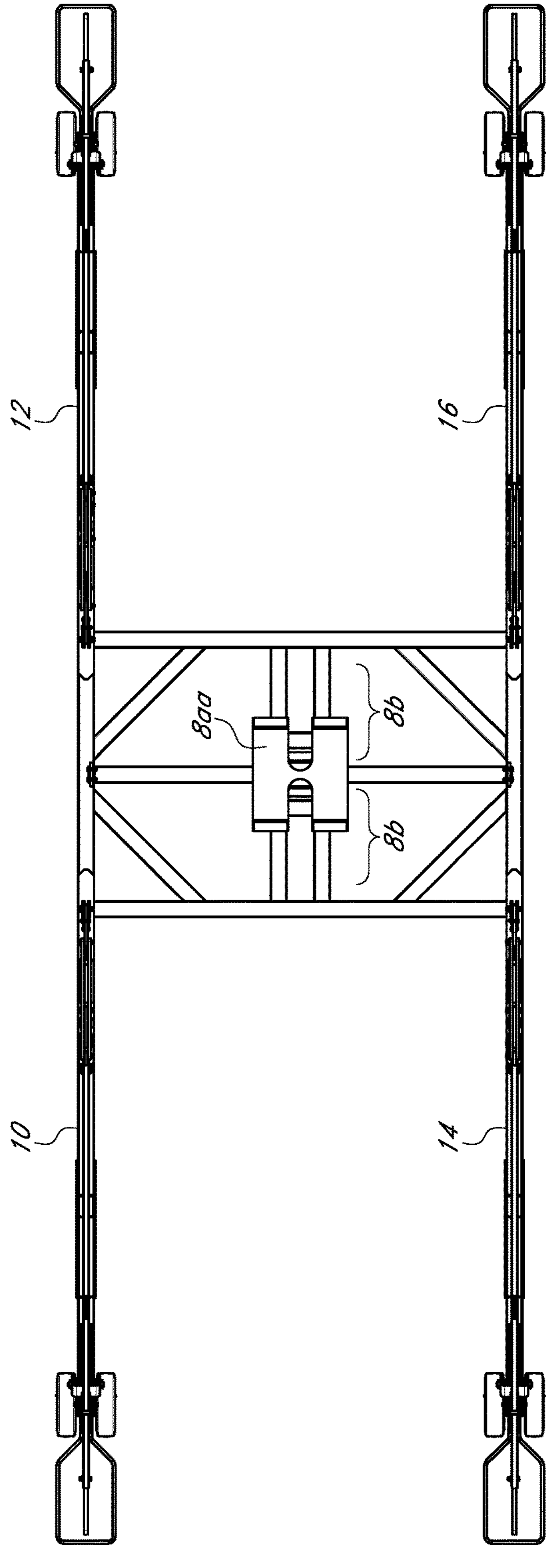
FIG. 1B is a top view of the Load Lifter Assembly as shown at FIG. 1 along with detailed call outs for enablement of the present disclosure.
Figure 1C:
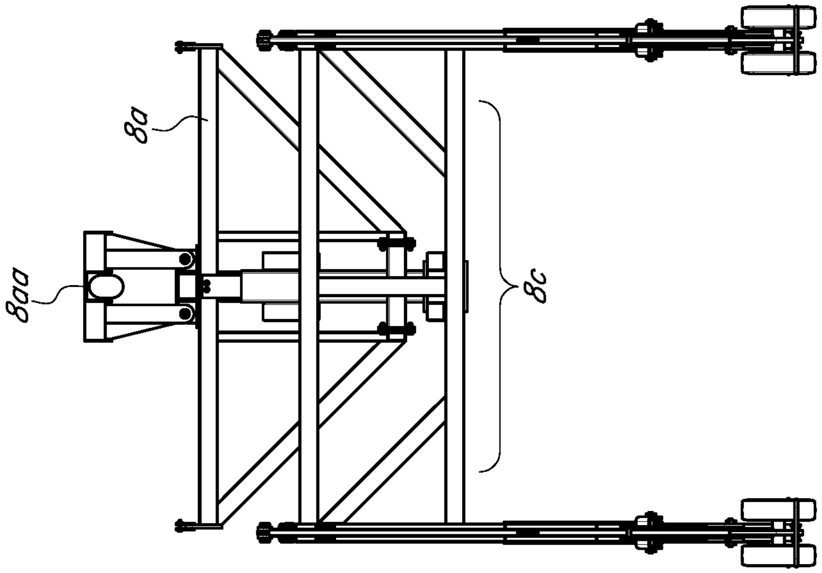
FIG. 1C is an end view of the Load Lifter Assembly as shown at FIG. 1 along with detailed call outs for enablement of the present disclosure.
Figure 1D:
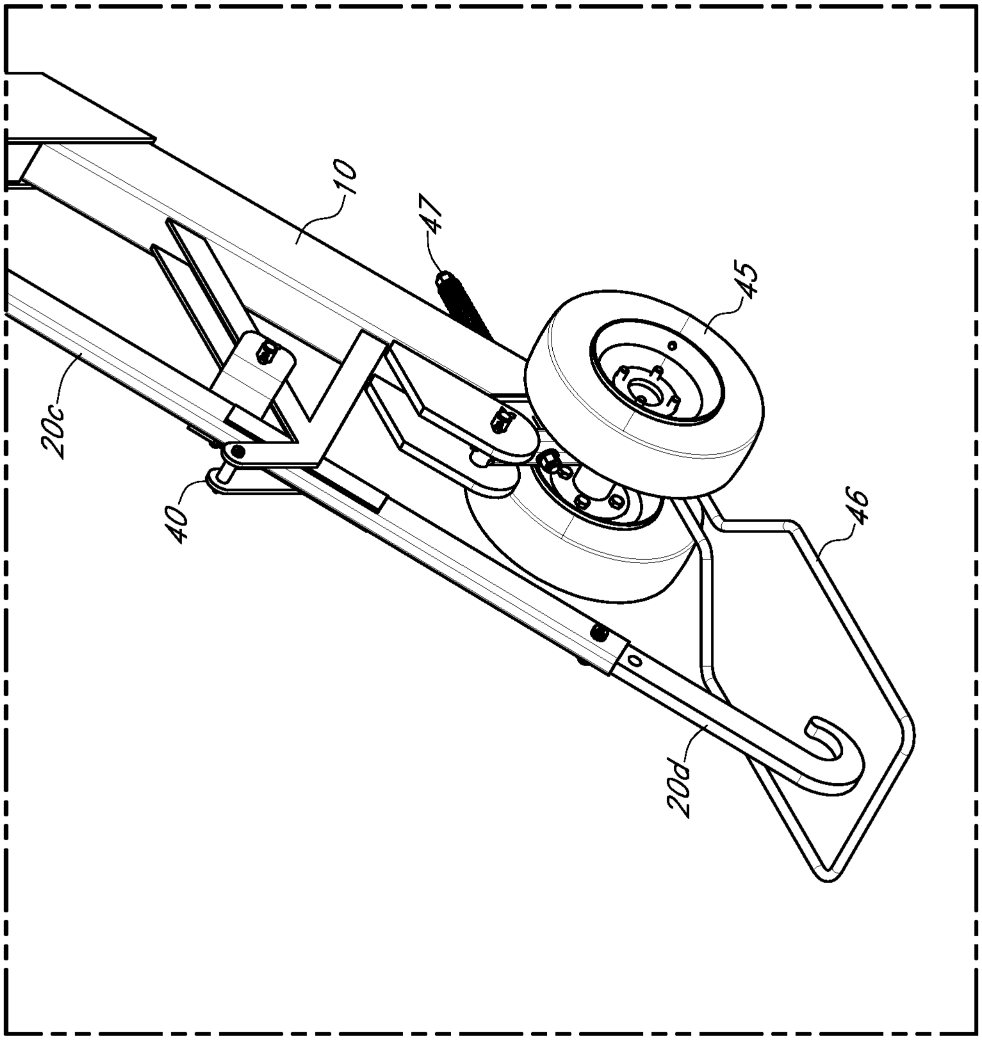
FIG. 1D is a detailed view of the guide assembly of a loading leg assembly with the load arm assembly positioned in the guide.

See also FIG. 1A (side view), FIG. 1B (top view) and FIG. 1C is a side view of the Load Lifter Assembly as shown at FIG. 1 along with detailed call outs for enablement of the present disclosure. FIG. 1D is a detailed view of the guide assembly 40 of a loading leg assembly with the load arm assembly positioned in the cradle like guide 41.

Figure 2:
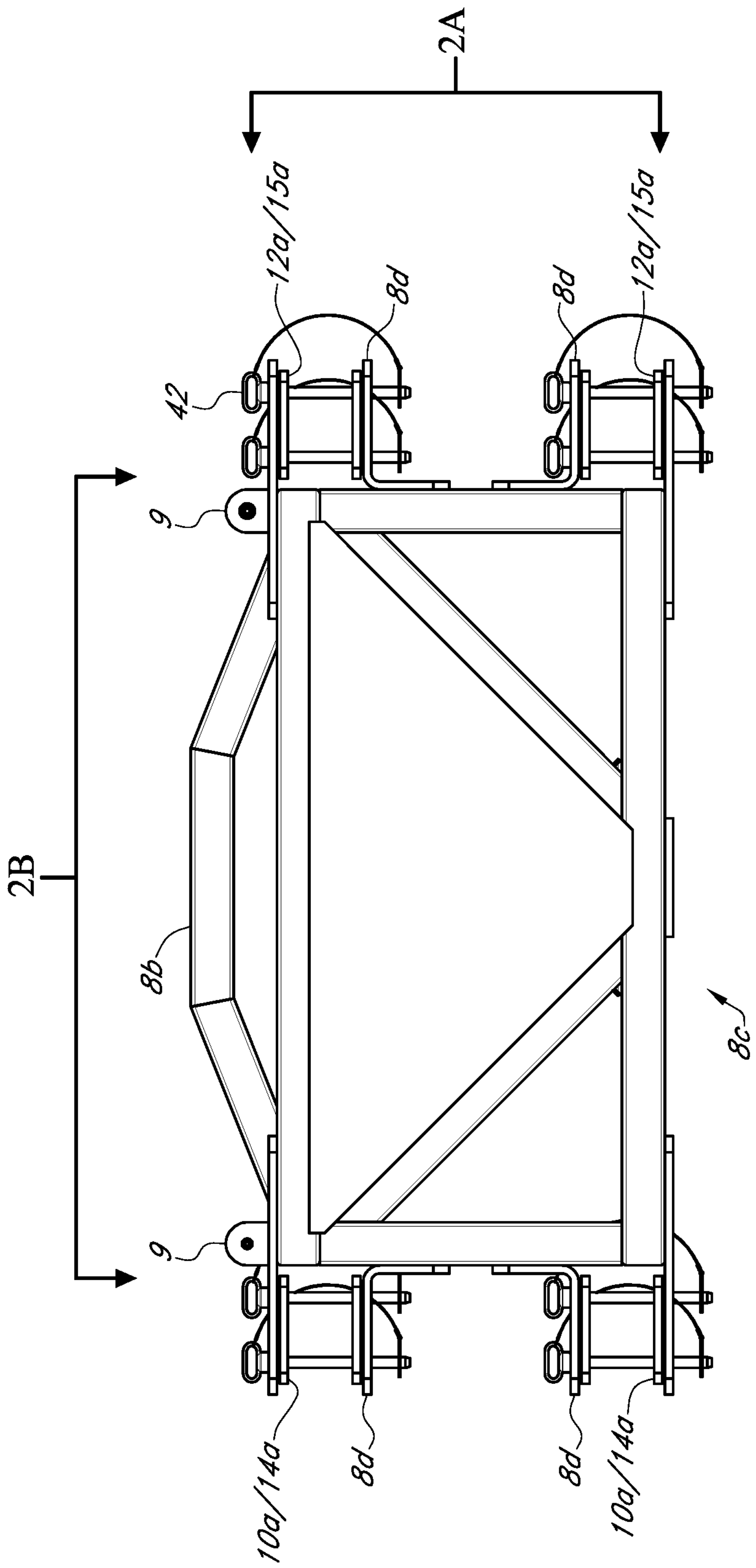
FIG. 2 is a detailed side view of the truss body of the Load Lifter Assembly as shown throughout.
Figure 2A:
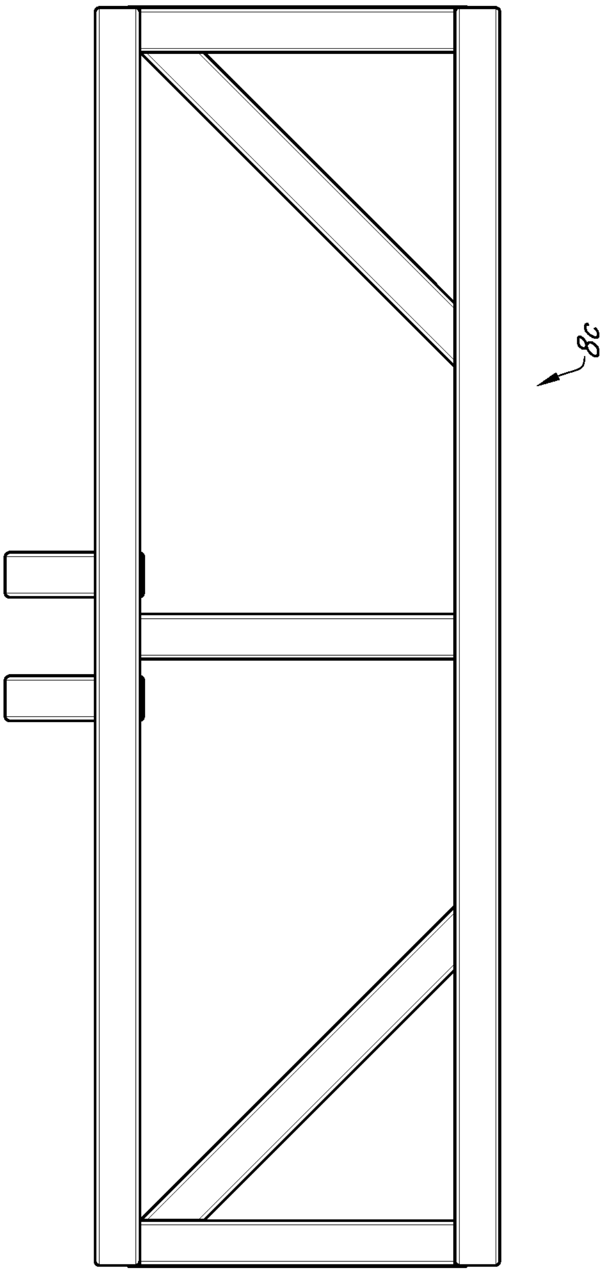
FIG. 2A is a detailed front view of the truss body of the Load Lifter Assembly as shown in FIG. 2 and throughout the remaining figures.
Figure 2B:
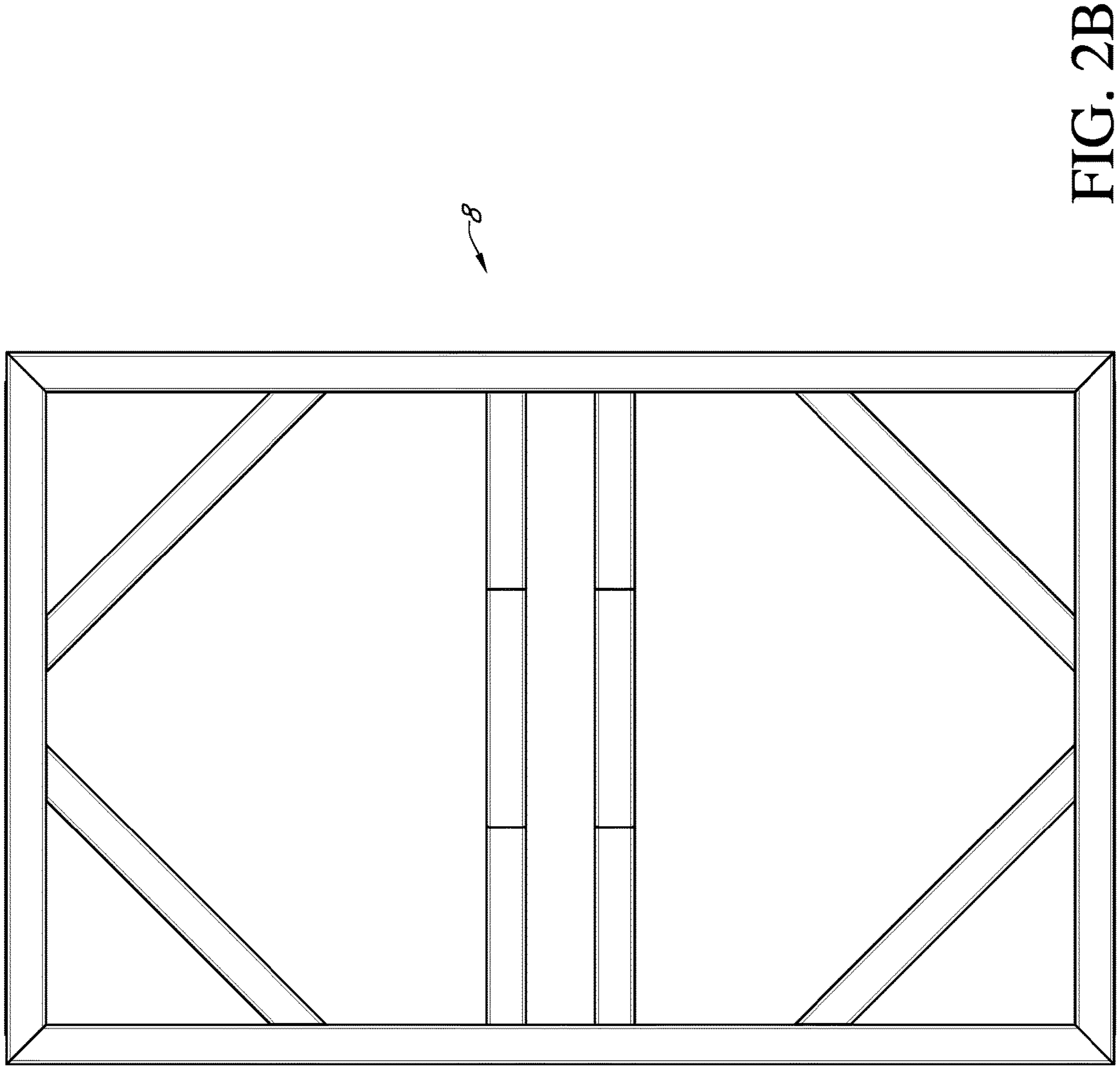
FIG. 2B is a top [detailed] view of the truss body center portion of the Load Lifter Assembly as shown in FIGS. 2 and 2A [plan view throughout].
Figure 3:
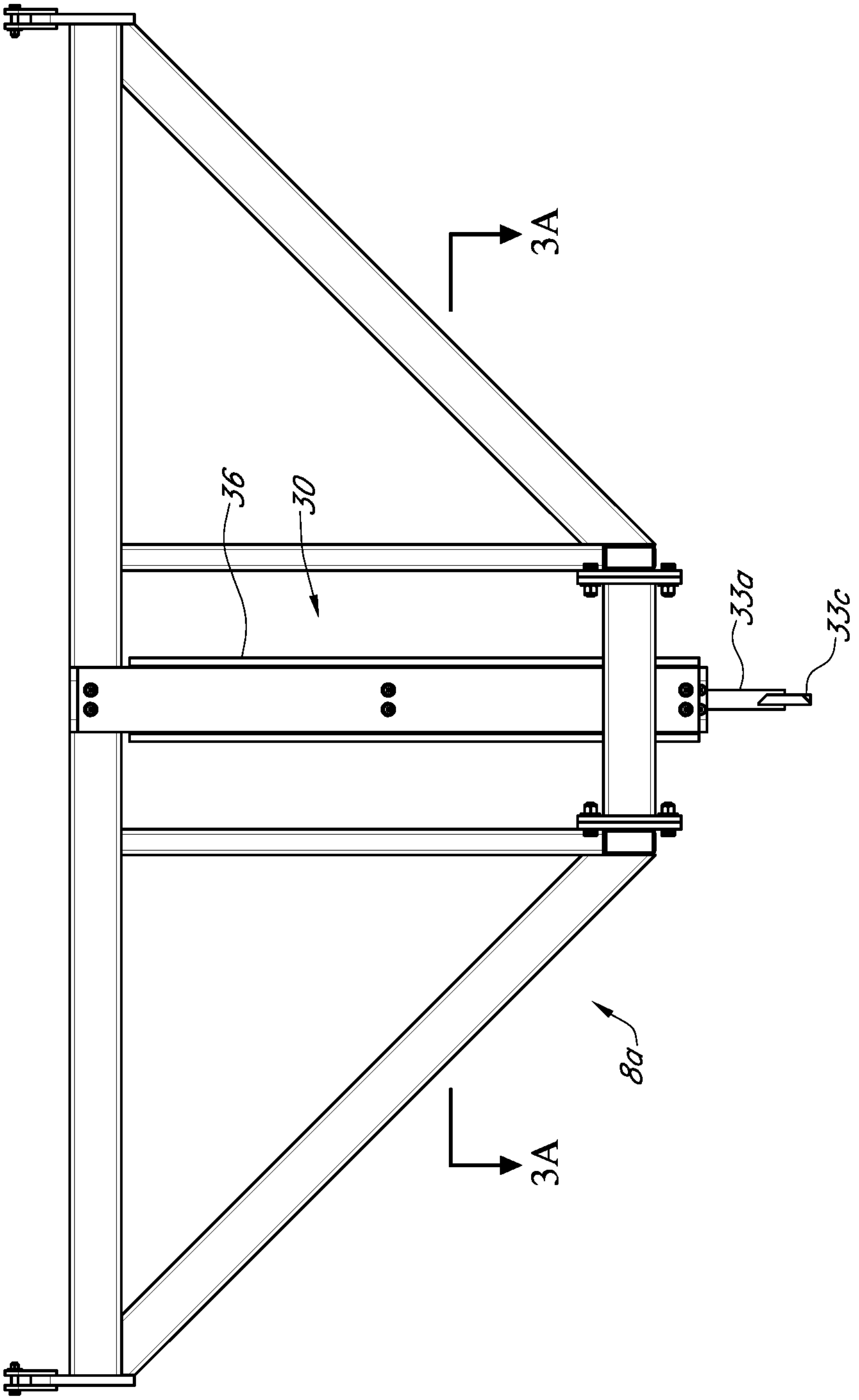
FIG. 3 is a detailed perspective view of the upper works assembly.
Figure 3A:
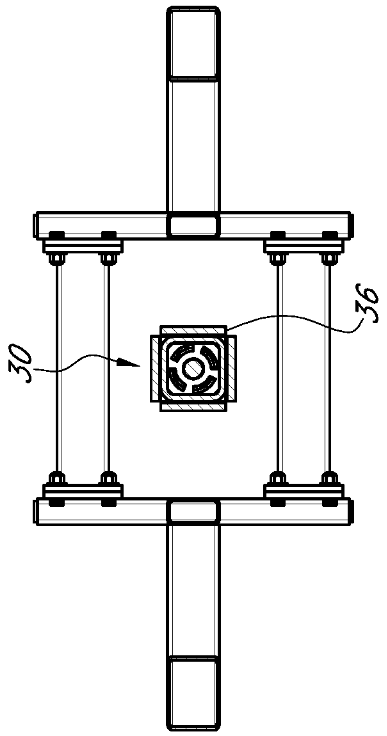
FIG. 3A is a detailed top view of the upper switch assembly.
Figure 3B:
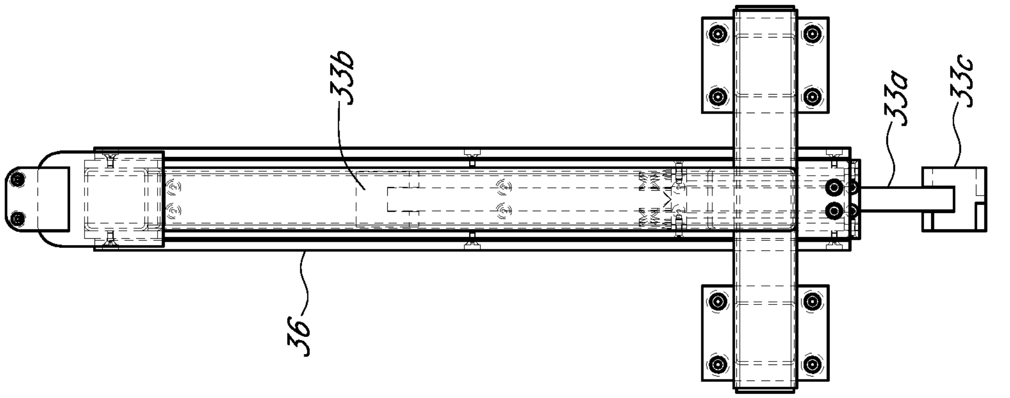
FIG. 3B is a side view of the inner tube of the master switch assembly having a blade positioned at each end of the shaft all located in the inner tube.
Figure 3C:
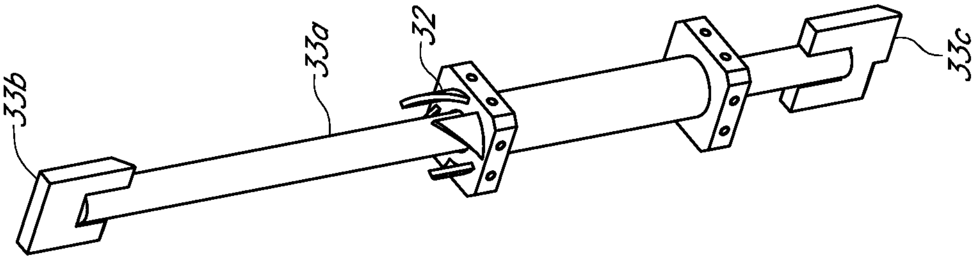
FIG. 3C is a detailed view of the internal shaft of the switch mechanism.
Figure 6:
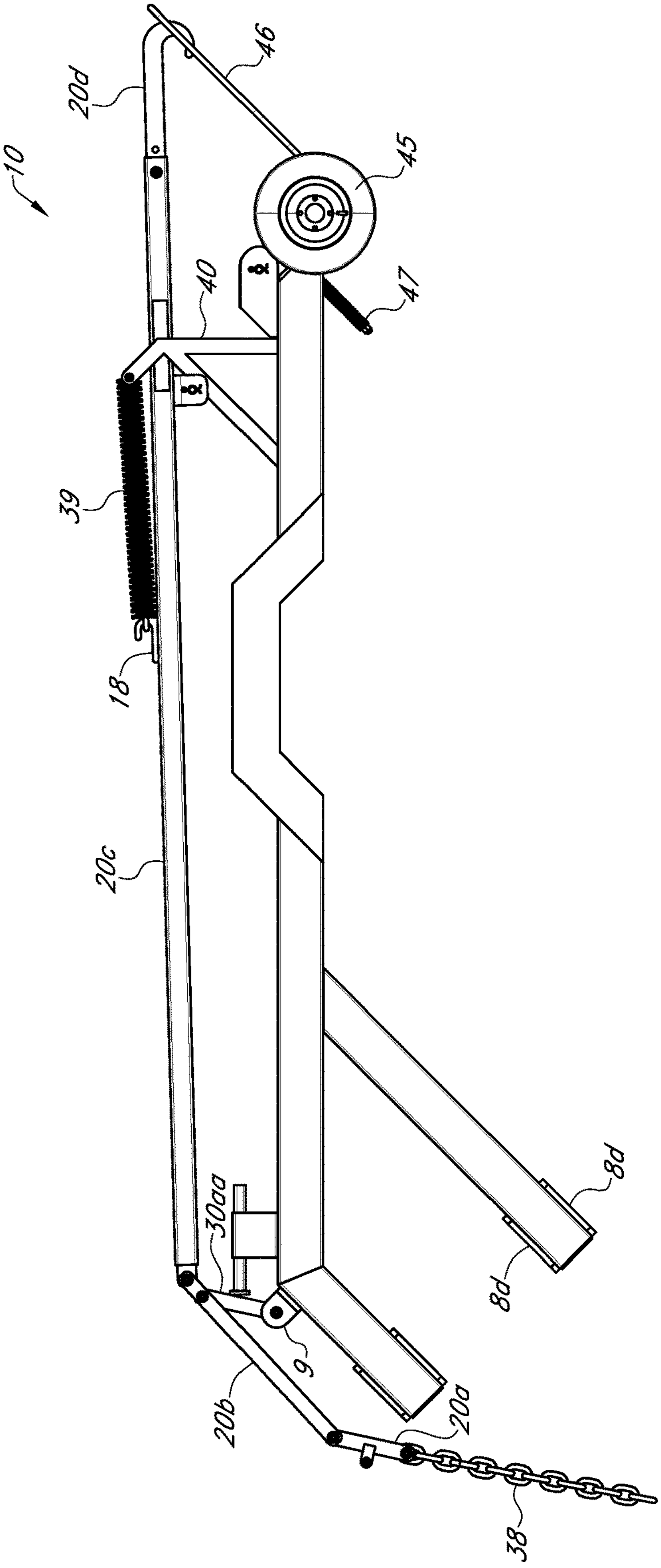
FIG. 6 is a detailed view of the leg assembly.
Figure 6A:
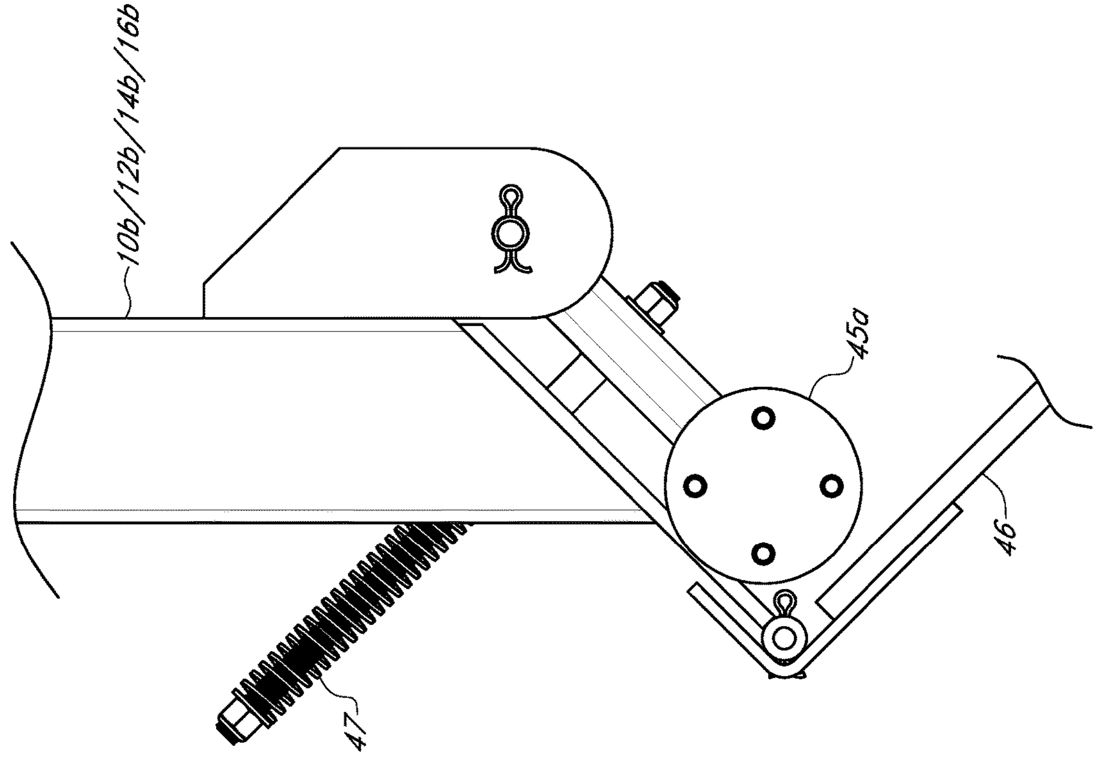
FIG. 6A is a detailed top view of the wheel assembly.
Figure 6B:
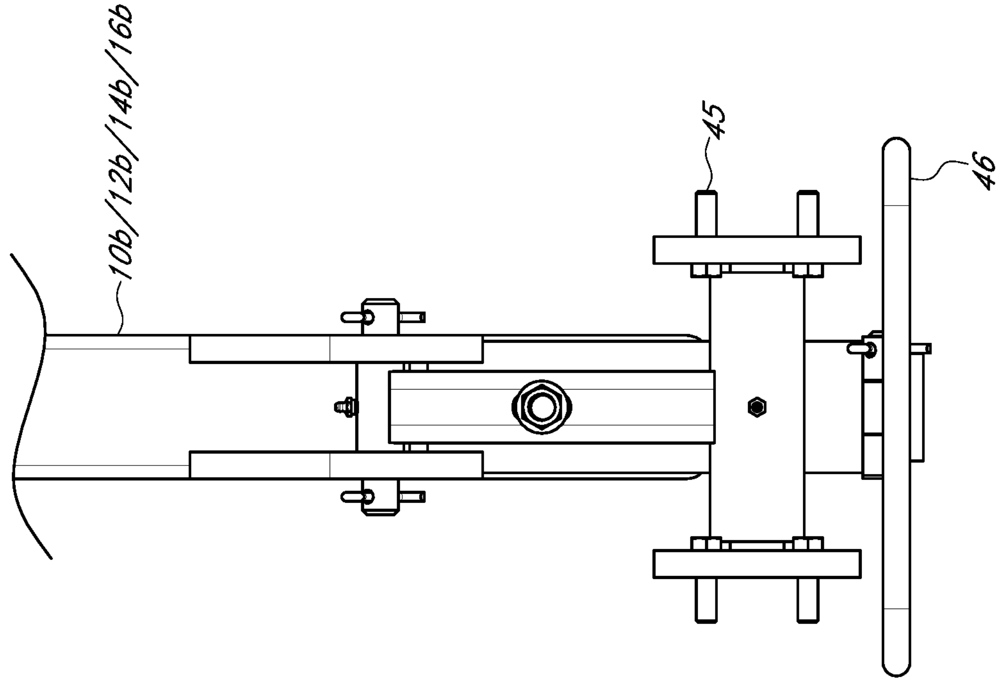
FIG. 6B is a detailed end view of the wheel assembly.

As shown FIGS. 2-3B, the main (truss) body 8 of the Load Lifter Assembly 100 is positioned between the loading leg assemblies (10, 12, 14 and 16) and is generally configured as a central rectangular structure that can support the load placed upon it by the lifting device, the load legs and the load and is further comprised of multiple cross members and supporting struts. (See also FIG. 1) FIG. 2A is a detailed end view of the truss body of the Load Lifter Assembly 100 as shown in FIG. 2 and throughout the remaining figures. Further, at each corner of the main body 8, on each side, plates have been welded to allow attachment with each load leg assembly thereby attaching the load leg assembly at two points to the main body 8. See also FIG. 2B which provides a detailed truss body plan view and FIG. 6. As will be understood from this description and the figures, the load arm assemblies (20, 22, 24, 26) also attach to the main body truss 8 via a pair of mounting eyes 9 mounted upon the top portion of the main truss body 8 at each corner. Each load arm assembly is comprised of three main segments. A first segment is configured with a pair of drop-down members 20*a* connected to a horizontal member 20*b*. The first end of each drop-down member 20*a* is then connected to the horizontal member 20*b*. The second end of the drop-down member connects to the mounting eyes 9 of the top portion of the main truss body 8. The second end of the horizontal member 20*b* is configured to attach the second segment of the load arm assembly which is a rod 20*c* which extends most of the length of the load leg assembly 10. The pivot action of the drop down members 20*a* attached to the main body truss 8 allows the horizontal members 20*b* to move generally horizontally yet affect generally vertical movement on the rod 20*c* which acts on the third segment of the load arm assemblies for lid engagement as will be discussed further herein as shown at FIGS. 6A-6B as guide assembly 40.

FIG. 3 is a detailed end view of the upper portion 8*a* (upper assembly) or upper works assembly which comprises the upper portion of the load lifter assembly. As shown, the upper works assembly is configured as an inverted "V" on top of and interior of the rectangular shaped main (truss) body 8 which provides support and stabilization during operation. (See also FIG. 1B) FIG. 3A is a detailed section view of the upper works assembly. FIG. 3B is a detailed side view of the upper works assembly of FIG. 3.

FIG. 3B is a side view of the inner tube 36 of the master switch assembly 30 having a blade (33*b*/33*c*) positioned at each end of the shaft 33*a* all located in the inner tube 36 which is configured to ride up and down inside outer tube 35 which is affixed to the lower portion of the main frame assembly 8*c*.

As shown, a lubricated inner sleeve square (36) is positioned in the center of the upper works assembly 8*a*. The upper works assembly is configured with a main support beam which is positioned above the main body. The center portion 8*b* may be configured to hold and support a switch assembly 30 to control a load engagement system 32 and the lower portion configured for engagement with the loading legs which engage with a load, which is shown through-out the figures as a barge lid 1 but is not so limited or restricted as other applications may be suitable for the structure and methods disclosed and claimed. As through-out and particularly in FIGS. 1-1*i*, a there are four loading legs 10, 12, 14 and 16. As shown in FIG. 1 each loading leg assembly (10, 12, 14, 16) has a first end (10*a*, 12*a*, 14*a*, 16*a*) and a second end (10*b*, 12*b*, 14*b*, 16*b*), with the first end configured for attachment to the lower portion of the main body 8*c*, the second end generally configured for engagement with the load. Each one of the four loading leg assemblies is further configured with a loading arm (20, 22, 24, 26, respectively) positioned proximate the loading leg and configured for actuation by the switch assembly 30 for engagement and disengagement with the load. As shown in FIGS. 1 and 6, the load arm assembly (20, 22, 24, 26) is positioned to extend the length of the load leg assembly (10, 12, 14, 16) from the top portion to the bottom portion where the load is engaged. See also FIG. 1A which is a top view of the Load Lifter Assembly 100 and FIG. 1B which is a side view of the Load Lifter Assembly as shown at FIG. 1.

Figure 4:
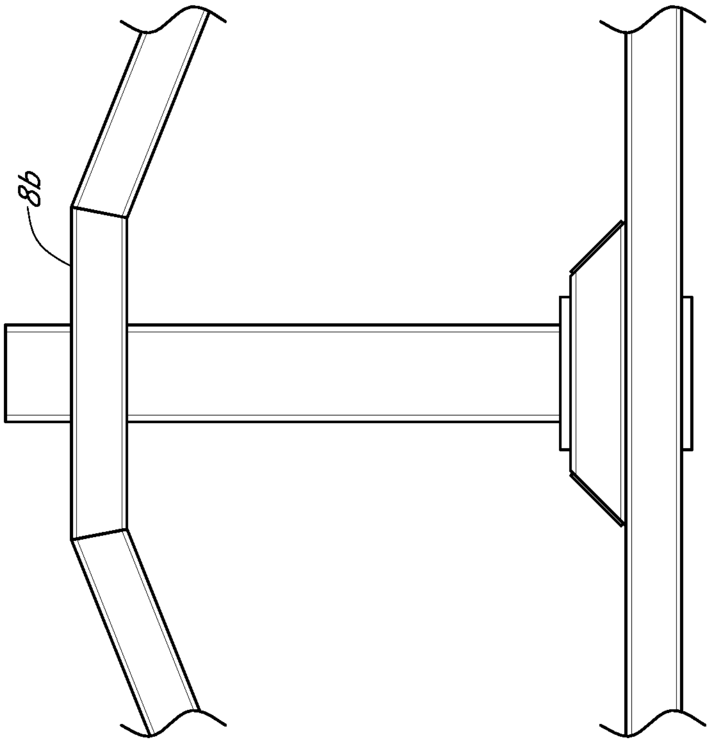
FIG. 4 is a side view of the lifting mechanism of the Load Lifter Assembly.
Figure 4A:
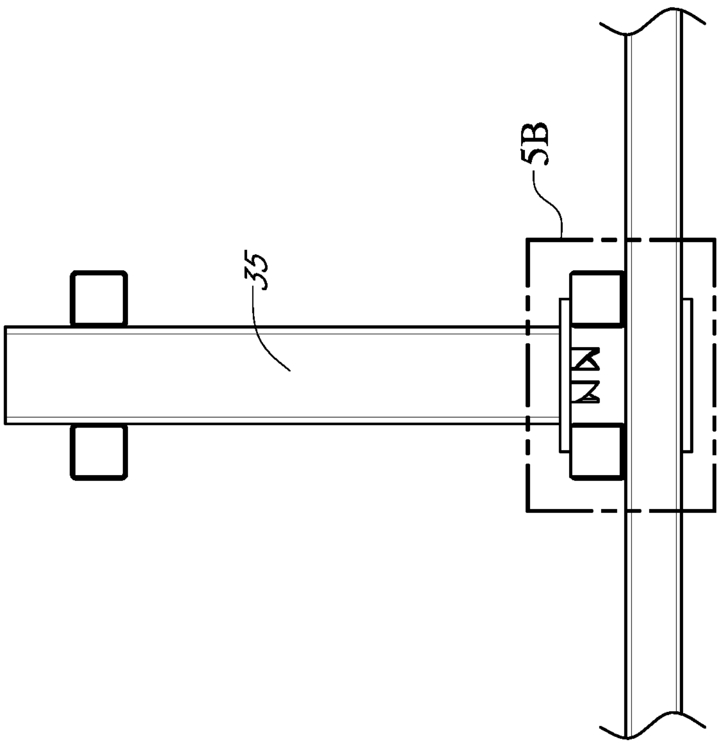
FIG. 4A is an end view of the lifting mechanism of the Load Lifter Assembly.
Figure 5A:
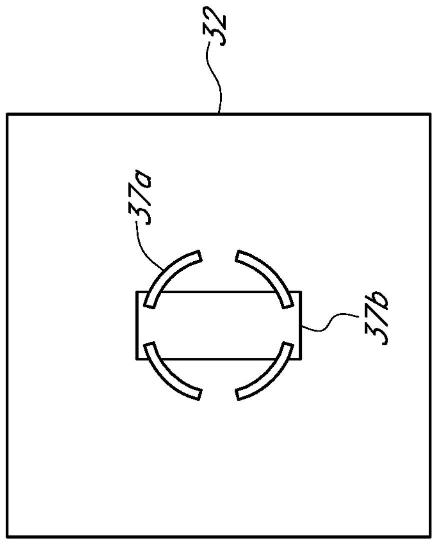
FIG. 5A is a detailed view of the upper switch plate.
Figure 5B:
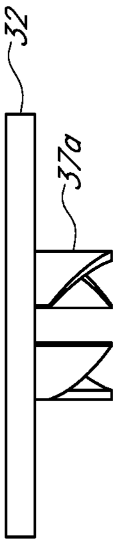
FIG. 5B is a detailed perspective view of the upper switch plate and its operation.
Figure 5C:
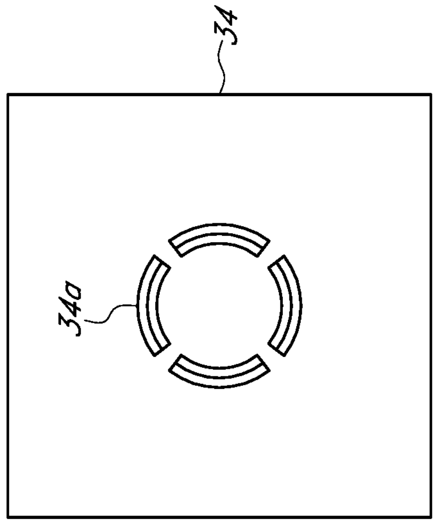
FIG. 5C is a detailed view of the lower switch plate.
Figure 5D:
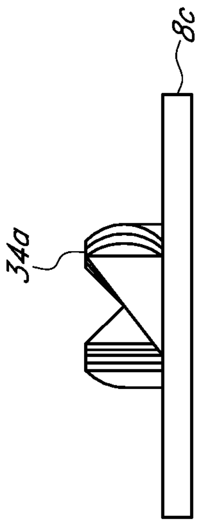
FIG. 5D is a detailed perspective view of the lower switch plate and its operation.

In at least one embodiment of the switch assembly 30 disclosed herein, the switch assembly 30 is configured as a control system to allow the load lifter assembly 100 to allow an operator (not shown) using a lifting device 50, such as crane or hi-line, engaged with the load lifter assembly upper portion 8*a* to control engagement and disengagement with the load by lifting, releasing and lowering the load lifting assembly 100. Further as shown in at least FIG. 1 and FIG. 6, the leg assembly is configured with guide wheels 45 positioned at the lower end of the loading leg assembly (10, 12, 14, 16), the guide wheel 45 configured to engage with and be positioned on the top of the barge lid 1, between and in the depression Ic between the ridges Id. See also FIG. 4 which is a side view of the lifting mechanism of the Load Lifter Assembly 100 and FIG. 4A is an end view of the lifting mechanism of the Load Lifter Assembly 100. FIG. 5 is a detailed view of the upper switch plate 32. FIG. 5A is a detailed view of the lower switch plate 34. FIG. 5B is a detailed perspective view of the switch plate and its operation.

Figure 6C:
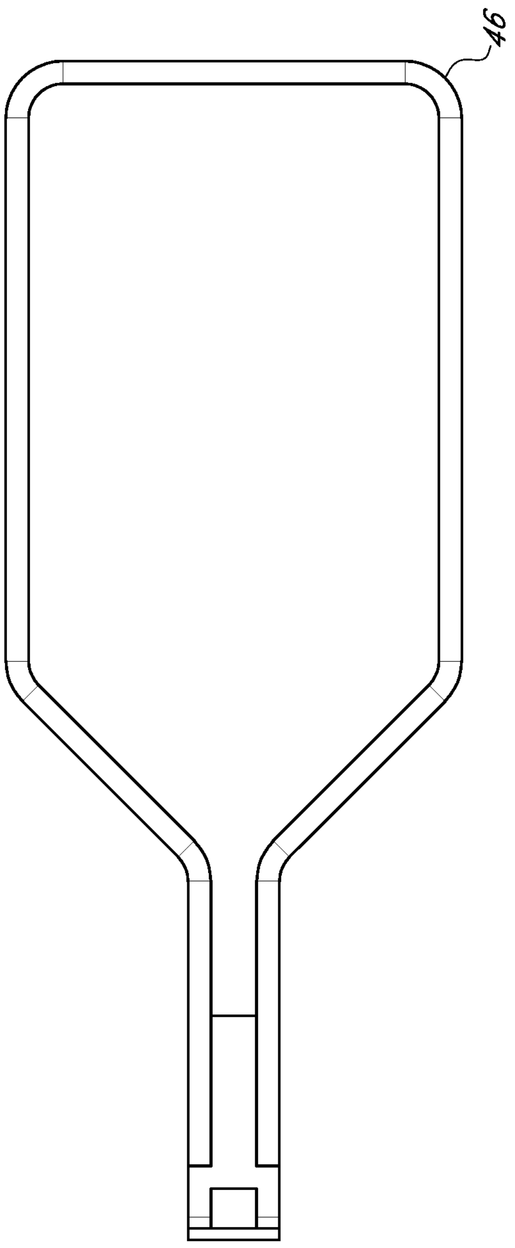
FIG. 6C is a top view of the guide bar which attaches to the wheel assembly.

FIG. 6 is a detailed view of one loading leg assembly (10, 12, 14, 16), which is labeled as 10. One of ordinary skill will appreciate that each of the loading leg assemblies (12, 14 and 16) are similarly configured and operate in a similar manner. As shown, a chain 38 is attached to the end of the first drop down member 20*a* which is pivotably attached to the horizontal member first end 20*b*. The second end of the horizontal member 20*b* is pivotably attached to the rod 20*c* of the loading arm assembly 20. As previously shown, the first end of the second drop down member 20*aa* is pivotably attached to the structure of the loading leg assembly 10 and the second end attached to the horizontal member 20*b*. The second end of the horizontal member 20*b* is pivotably attached to the first end of the rod 20*c* which extends along the length of the leg assembly 10 to the guide assembly 40. FIG. 6A is a detailed top view of the wheel assembly 45 of the guide assembly 40 and FIG. 6B is a detailed end view of the wheel assembly 45. FIG. 6C is a top view of the guide bar 41 which attaches to the guide assembly 40. As shown the ends of the leg assemblies (10,12,14,16) are configured with guide wheels [25] 45 and guards 46. The load arm assemblies 10 are configured to operate upon and slide through the guide bar assembly 40 [41] with the [hooks] hooked end 20*d* positioned proximate the [hooks or] eyes 2 around the rim (edge) 1*a* of the barge lid 1. The wheels 45 work to position the hooked end 20*d* upon the lid 1 and proximate the [hooks or] eyes 2.

Method of Operation

Figure 7:
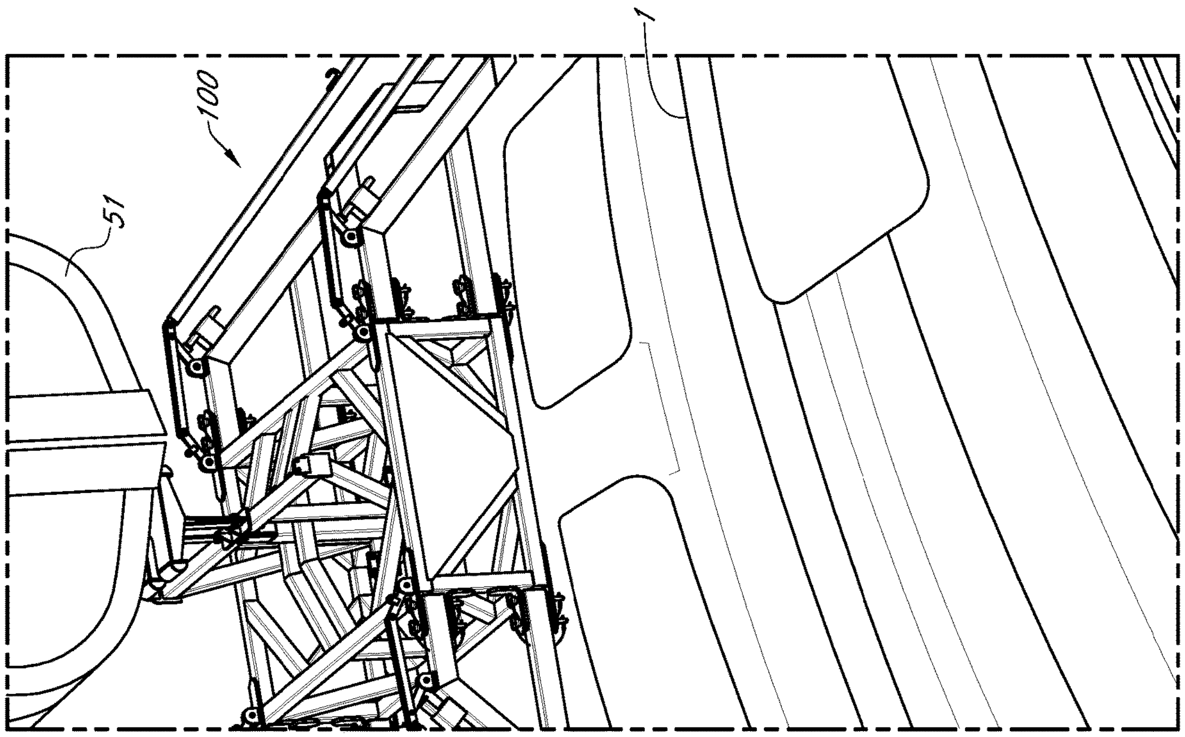
FIG. 7 illustrates the clamshell of the loader engaging the "T" of the load lifter assembly which is engaged with a barge lid.
Figure 8:
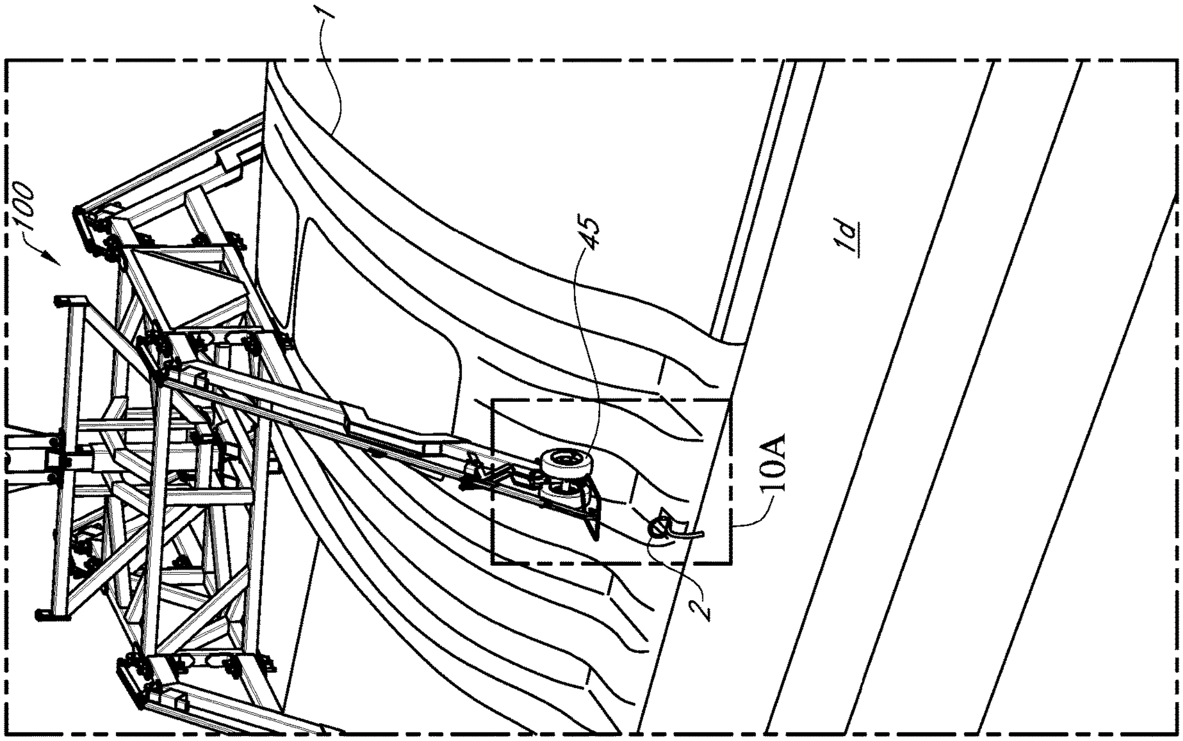
FIG. 8 illustrates the load lifter assembly engaged with a barge lid during the lid removal process wherein the hooks have deployed to engage with the barge lid.
Figure 9:
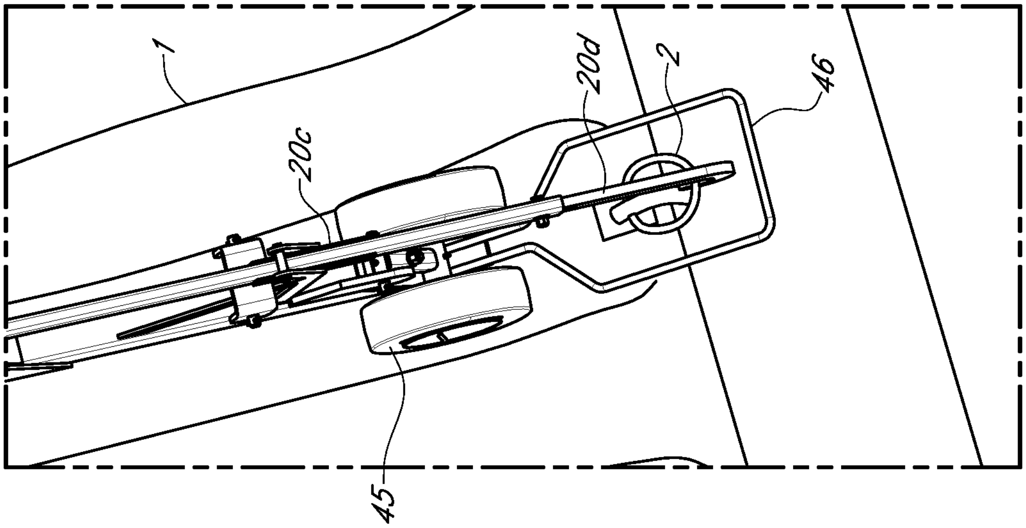
FIG. 9 illustrates the wheel engaged with a ridge in the barge lid setting position of the hook for deployment and engagement with the barge lid.

FIG. 7 illustrates the clamshell of the loader enclosing the engagement end 8*aa* configured as a "T" of the load lifter assembly 100 which is engaged with a barge lid 1. FIG. 8 illustrates the load lifter assembly 100 just prior to engagement with the barge lid 1 during the lid removal process wherein the hooks 2 of the barge lid 1 are to be engaged with the the guide assembly 40. FIG. 9 illustrates the guide wheels 45 engaged with a ridge 1*b* in the barge lid setting the position of the guide assembly/bar (40/41) with the hook/eye 2 of the barge lid for securement.

Figure 10:
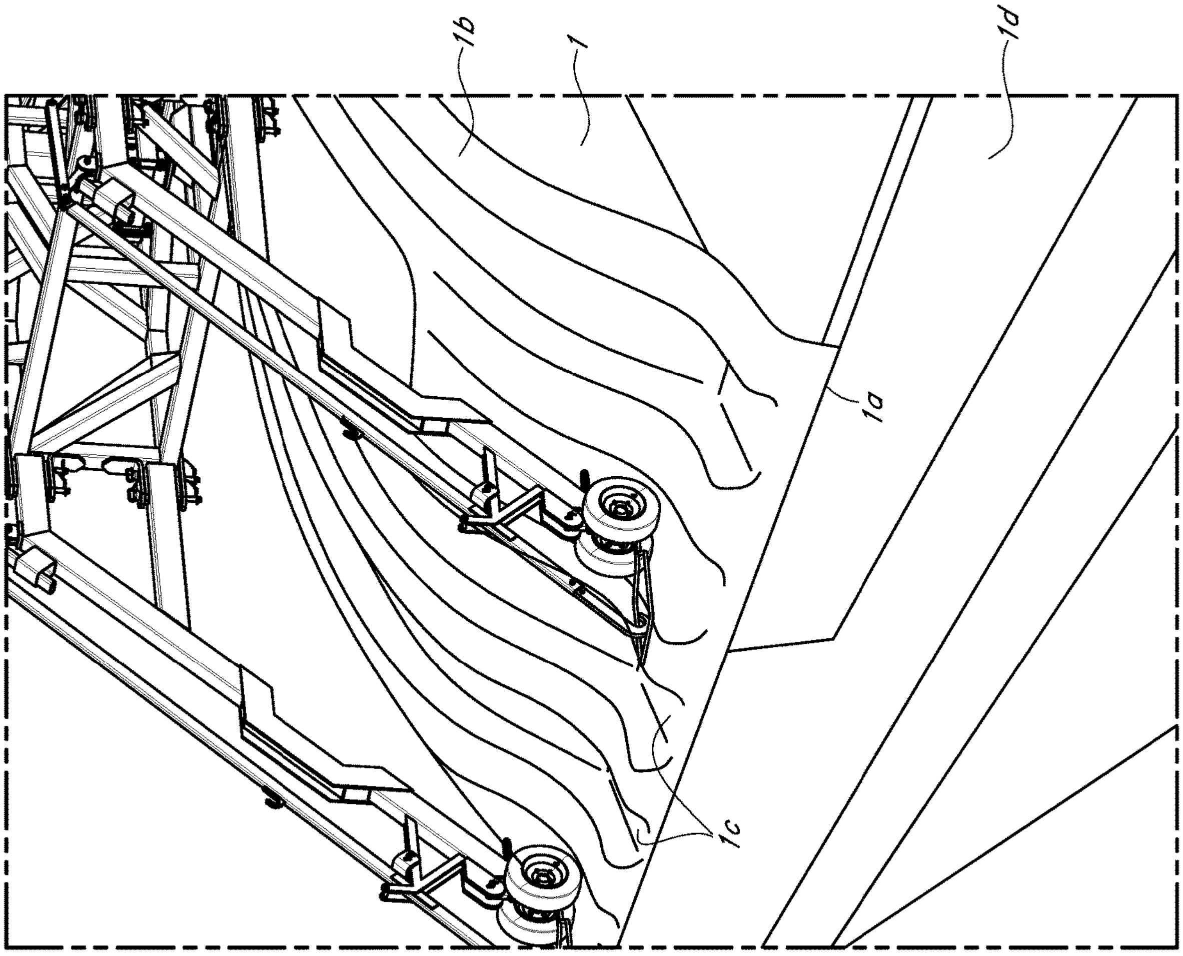
FIG. 10 illustrates the load lifter assembly with hooks engaged around the edge of the lid, the guide wheels engaged in the recesses of the lid and the lid being either removed or attached to the barge.
Figure 10A:
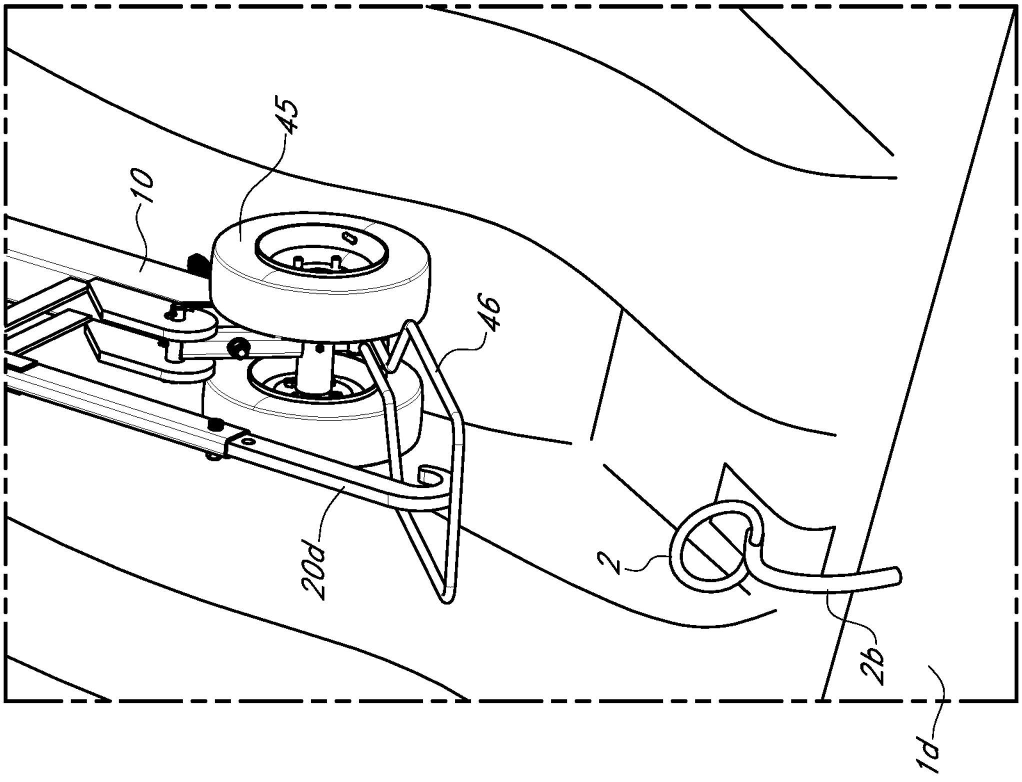
FIGS. 10A and 10B are a detailed view of the hook end of the load arm of FIG. 10 engaging with the eye of the barge lid to lock or unlock the lid to the barge.
Figure 10B:
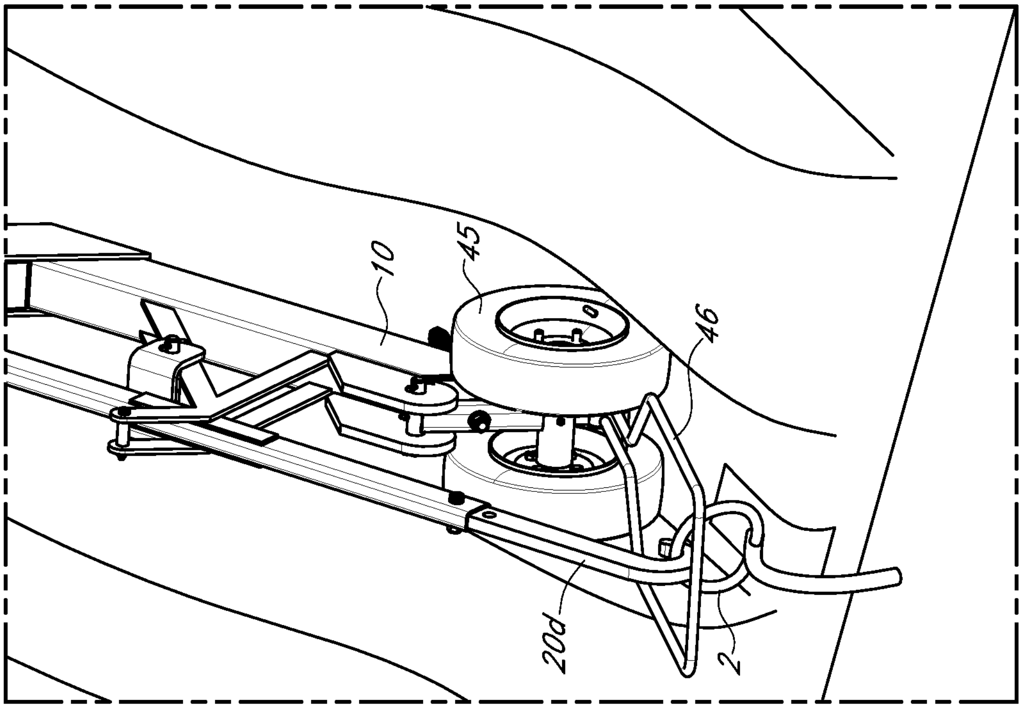

As shown, the load lifter assembly 100 has been allowed to rest against the barge lid 1 via the wheels 45, allowing release of the master switch 30 (hydraulic cylinder) which then actuates the guide assembly 40 via the chain 38 acting on the load arm assemblies 20 and the springs 39 therein. When the load lifter assembly 100 is then lifted, the guide assemblies 40 are engaged with the hooks or eyes 2 of the barge lid thus securing the barge lid 1 to the load lifter assembly 100. FIG. 10 illustrates the load lifter assembly 100 with hooks 2 fully engaged around the edge of the lid, the guide wheels 45 engaged in the recesses of the lid and the lid being removed from the barge. One of ordinary skill will appreciate that load lifter assembly 100 is configured to either operate to position and place the barge lid 1 upon the barge or remove the lid from the barge as well. FIG. 10B is a detailed view of the hook end of the load arm of FIG. 10 engaging with the eye of the barge lid to lock or unlock the lid to the barge.

Figure 10C:
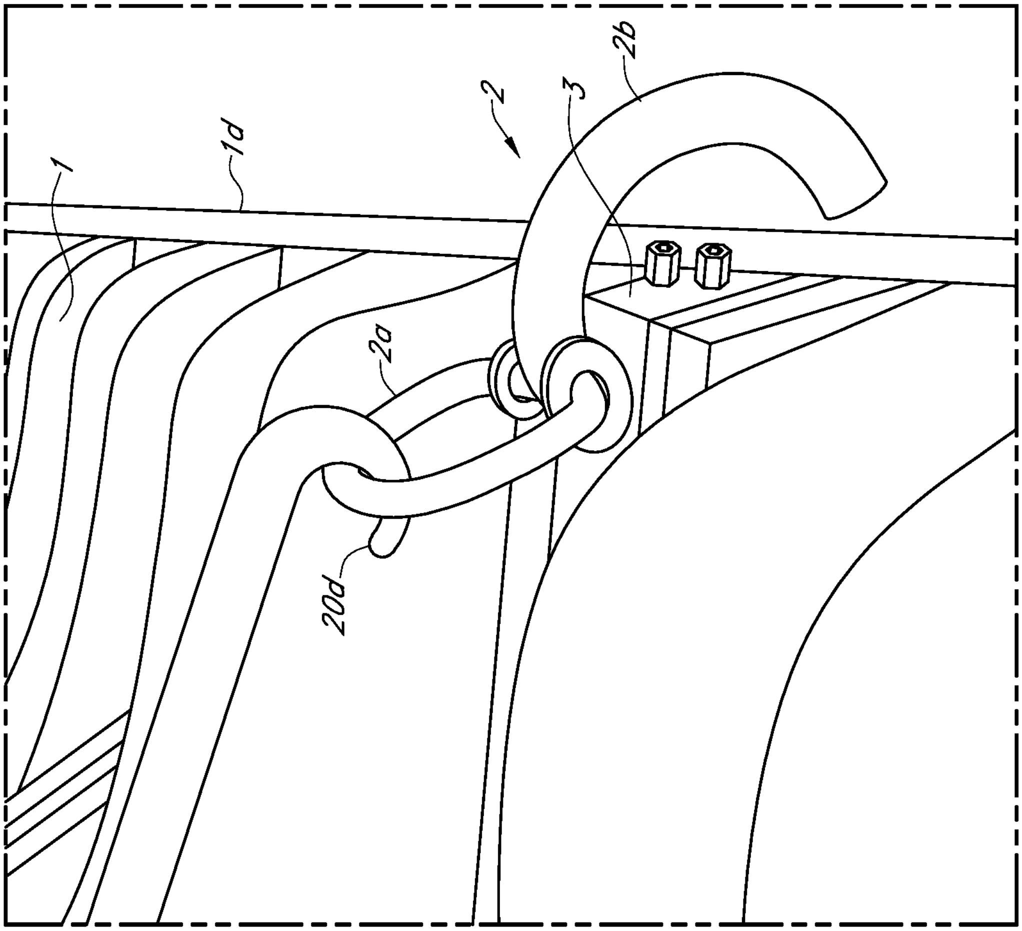
FIG. 10C is a detailed view of the barge lid eye (latch) moving to the unlocked position by actuation of the load arm hook end on the eye.

FIG. 10C is a detailed view of the barge lid eye (latch) moving to the unlocked position by actuation of the load arm hook end on the eye.

Figure 11A:
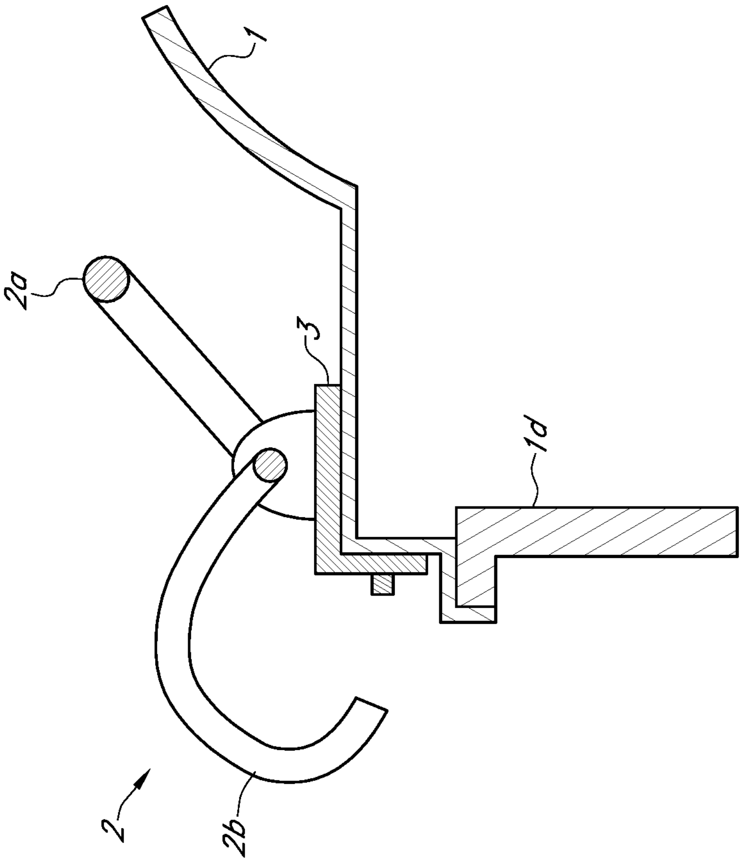
FIG. 11A (PRIOR ART)
FIGS. 11A-11B illustrate the prior art latching eyes of convential barge lids.
Figure 11B:
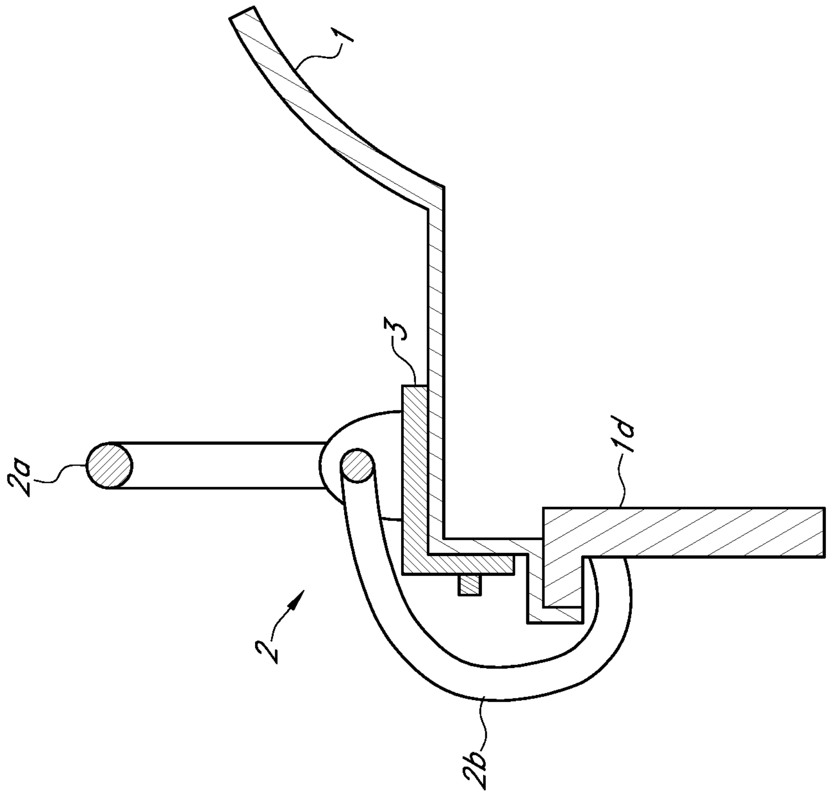
FIG. 11B (PRIOR ART)

As shown in detail in FIGS. 11A-11B, conventional barge lids 1 include one or more latch members, referenced herein as hooks or lifting eyes 2 (hereinafter eye) which can be pivotally disposed on lid 1 and can be used to effectively latch and unlatch lid 1 to and from the barge 1*d*. As shown, eye 2 in FIG. 11B is pivotally disposed on a bracket 3 attached to lid 1. Eye 2 is shown with a hook portion 2*a* and eyelet portion 2*b*. As the lifting eye 2 rotates with respect to lid 1, the hook portion 2*a* can rotate to engage or disengage the barge. As can be seen from FIG. 11B, the eye 2 can be in a normally latched position, with the hook portion 2*a* engaging barge lid 1 such that lid 1 remains latched or locked onto the barge 1*d*.

It is contemplated that in the illustrative embodiment shown in the enclosed figures the Load Lifter Assembly 100 may be constructed of, but not limited to, any metal or combination of metals including bronze, steel and aluminum; plastics or carbon fiber including Kevlar®, foam-blown polyurethane, thermoplastic polyurethane, ethylene vinyl acetate, other polymers, other thermoplastics, carbon rubber, blown rubber polymers, composite materials, natural materials (e.g., rubber, leather, etc.), elastomers, combinations thereof, and/or any other material with suitable characteristics (e.g., compressive strength, stability, elasticity, density). This particular embodiment of a Load Lifter Assembly100 was fabricated from steel using various laser cutting, welding, securement and machining technologies which are well known to those of ordinary skill in the art. One of ordinary skill will appreciate that the Load Lifter Assembly 100 could be constructed by any method known to those in the art including via casting, forging and machining or stamping and punching, without restriction or limitation. One of ordinary skill will appreciate that the Load Lifter Assembly 100 disclosed herein is designed, fabricated and configured to work with any type of bucket which can engage the upper portion of the load lifter assembly and or any type of cable or chain which be engaged with or wrapped around the load lifter assembly as shown but is in no way limited to working only with particular buckets, cables or chains shown herein.

Having described the preferred embodiments, other features of the Load Lifter Assembly 100 will undoubtedly occur to those versed in the art, as will numerous modifications and alterations in the embodiments as illustrated herein, all of which may be achieved without departing from the spirit and scope of the Load Lifter Assembly100 disclosed herein. Accordingly, the methods and embodiments pictured and described herein are for illustrative purposes only, and the scope of the present disclosure extends to all method and/or structures for providing increased functionality, comfort, longevity, enjoyment and aesthetics in the use and access of Load Lifter Assemblies 100. Furthermore, the methods and embodiments pictured and described herein are no way limiting to the scope of the Load Lifter Assembly 100 and method of use unless so stated in the following claims.

It should be noted that the Load Lifter Assembly100 is not limited to the specific embodiments pictured and described herein, but is intended to apply to all similar apparatuses and methods for providing the various benefits and/or features of a Load Lifter Assembly100. Modifications and alterations from the described embodiments will occur to those skilled in the art without departure from the spirit and scope of the Load Lifter Assembly100. It is understood that the Load Lifter Assembly 100 as disclosed herein extends to all alternative combinations of one or more of the individual features mentioned, evident from the text and/or drawings, and/or inherently disclosed. All of these different combinations constitute various alternative aspects of the Load Lifter Assembly 100 and/or components thereof. The embodiments described herein explain the best modes known for practicing the Load Lifter Assembly100 and/or components thereof and will enable others skilled in the art to utilize the same. The claims are to be construed to include alternative embodiments to the extent permitted by the prior art.

While the Load Lifter Assembly100 has been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including but not limited to: Maters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as illustrative only, with a true scope and spirit being indicated by the following claims.

What is claimed is:

1. A load lifter assembly for use in lifting operations of barge lids comprising:

a. a main body having an upper portion, a central rectangular-shaped structure having a center portion and a lower portion, the upper portion configured for engagement with the working end of a lifting device, the center portion configured to hold and support a switch assembly to control a load engagement system and the lower portion configured for engagement with a load, wherein the lower portion extends in generally horizontal orientation;

b. a first loading leg having a first end and a second end, the first end configured for attachment to the lower portion of the main body, the second end configured for engagement with the load;

c. a second loading leg having a first end and a second end, the first end configured for attachment to the lower portion of the main body, the second end configured for engagement with the load;

d. a third loading leg having a first end and a second end, the first end configured for attachment to the lower portion of the main body, the second end configured for engagement with the load;

e. a fourth loading leg having a first end and a second end, the first end configured for attachment to the lower portion of the main body, the second end configured for engagement with the load;

f. a first loading arm positioned proximate the first loading leg and configured for actuation by the switch assembly for engagement and disengagement with the load;

g. a second loading arm positioned proximate the second loading leg and configured for actuation by the switch assembly for engagement and disengagement with the load;

h. a third loading arm positioned proximate the third loading leg and configured for actuation by the switch assembly for engagement and disengagement with the load;

i. a fourth loading arm positioned proximate the first loading leg and configured for actuation by the switch assembly for engagement and disengagement with the load; and, j) wherein the switch assembly further comprises an inner tube which is configured to ride up and down inside an outer tube, the outer tube being affixed to the center portion of the main body and the inner tube being affixed to the upper portion of the main body to allow the load lifter assembly to allow an operator using a lifting device engaged with the load lifter assembly to control engagement and disengagement with the load by the lifting, releasing, and lowering of the load lifting assembly.

2. The load lifter assembly for use in lifting operations of barge lids according to claim 1 wherein the switch assembly mechanism is positioned in the center of the main body and is configured to rotate a quarter turn each cycle of lifting, releasing, and lowering the load lifting assembly.

3. The load lifter assembly for use in lifting operations of barge lids according to claim 1 wherein during the cycle of lifting, releasing, and lowering, when the lid is let down, the switch assembly mechanism allow the hooks engaged with the barge lid to be released.

* * * * *